(12) United States Patent
Paul et al.

(10) Patent No.: US 12,263,893 B2
(45) Date of Patent: Apr. 1, 2025

(54) AIR GUIDE DEVICE FOR A MOTOR VEHICLE

(71) Applicant: Dr. Ing. h.c. F. Porsche Aktiengesellschaft, Stuttgart (DE)

(72) Inventors: Joachim Paul, Benningen a.N. (DE);
Henrik Heidorn, Renningen (DE);
Haiko Neher, Sachsenheim (DE);
Dominik Beierl, Korntal-Münchingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 455 days.

(21) Appl. No.: 17/881,706

(22) Filed: Aug. 5, 2022

(65) Prior Publication Data

US 2023/0057190 A1 Feb. 23, 2023

(30) Foreign Application Priority Data

Aug. 18, 2021 (DE) ...................... 10 2021 121 394.0

(51) Int. Cl.
*B62D 37/02* (2006.01)
*B62D 35/00* (2006.01)

(52) U.S. Cl.
CPC ........... *B62D 37/02* (2013.01); *B62D 35/008* (2013.01)

(58) Field of Classification Search
CPC ...... B62D 21/152; B62D 25/20; B62D 21/00; B60K 1/04; B60K 2001/0438; B60K 2001/0405; B60K 2001/0455; B25H 1/0007; B60L 50/66; B60L 53/80; B60S 5/06

See application file for complete search history.

(56) References Cited

U.S. PATENT DOCUMENTS 8,033,593 B2  10/2011  Ramin et al.

FOREIGN PATENT DOCUMENTS

| DE | 102008036188 A1 | 2/2010 |
| DE | 102014000930 A1 | 7/2015 |
| DE | 102020103140 A1 | 8/2021 |
| WO | 2016020424 A1 | 2/2016 |

*Primary Examiner* — Paul N Dickson
*Assistant Examiner* — Sara Laghlam
(74) *Attorney, Agent, or Firm* — Buchanan Ingersoll & Rooney PC

(57) ABSTRACT

An air guide device for a motor vehicle having an air guide element and a movement mechanism. The air guide element forming a rear side part of a body of the motor vehicle so as to be movable relative to the remaining body. The air guide element is movable between an inoperative position and at least one operating end position. The air guide element, in its inoperative position, is flush with the remaining body. The rear side part has a flow guide surface which faces an environment of the motor vehicle and along which air flows. The air guide element has a surface which is at least part of the flow guide surface. The air guide element, in its operating end position, is configured to extend the flow guide surface along a body longitudinal axis (X) of the body.

10 Claims, 3 Drawing Sheets

AIR GUIDE DEVICE FOR A MOTOR VEHICLE

CROSS-REFERENCE TO RELATED APPLICATION

This application claims priority to German Patent Application No. 10 2021 121 394.0, filed Aug. 18, 2021, the content of such application being incorporated by reference herein in its entirety.

FIELD OF THE INVENTION

The invention relates to an air guide device for a motor vehicle.

BACKGROUND OF THE INVENTION

Air guide devices for improving motor vehicle stability and for reducing fuel by reducing flow losses, in particular in a medium to upper speed range of the motor vehicle, are known. For this purpose, use is made in particular of what are referred to as spoilers which are arranged in a rear region of a body of the motor vehicle and extend predominantly along a body transverse axis.

A further possibility for reducing flow losses is to influence an air flow, forming along a body side surface, in a rear region of the motor vehicle body during operation of the motor vehicle.

WO 2016/020424 A1, which is incorporated by reference herein, discloses an air guide device for a motor vehicle, which has an air guide element which is designed such that it can be received in a fender formed in the rear region of a motor vehicle body. In order to receive the air guide element, the fender has an opening in which the air guide element in its inoperative position is arranged flush with the fender. The air guide element is extended in the direction of a body transverse axis, wherein, in the operating position, a spacing is formed between the air guide element and the motor vehicle body over an entire extent of the air guide element. If the air guide element is fully extended, it can additionally be pivoted about a body vertical axis.

DE 10 2014 000 930 A1, which is incorporated by reference herein, discloses a motor vehicle with an air guide element which is likewise received in an opening in a fender, arranged in a rear region, of the motor vehicle body. The air guide element is extended from its inoperative position, in which it is likewise arranged flush with the fender, in the direction of a body transverse axis, with a spacing likewise being produced between the fender and the air guide element. In the extended state, there is the possibility of pivoting the air guide element, which is designed in the manner of a wing, about an axis extending in the direction of the body transverse axis.

One disadvantage of the air guide devices according to the prior art is that additional aerodynamic drag is caused since the air guide elements in their operating position are completely spaced apart from the body, as a result of which a channel is formed between the air guide element and the body, the edges of the channel itself being able to produce separations in the air flow and therefore vortices. Air can also flow behind the air guide element.

SUMMARY OF THE INVENTION

An air guide device according to aspects of the invention for a motor vehicle has an air guide element and a movement mechanism, the air guide element being designed as at least part of a rear side part of a body of the motor vehicle so as to be movable relative to the remaining body. The air guide element is arranged such that it can be brought into an inoperative position and at least one operating end position, the air guide element in its inoperative position being arranged flush with the remaining body. The rear side part has a flow guide surface which is designed to face an environment of the motor vehicle and along which air flows. The air guide element has a surface which is at least part of the air guide surface. The air guide element in its operating end position is configured to extend over the flow guide surface along a longitudinal axis of the body. According to aspects of the invention, in order to avoid a flow behind the air guide element in at least its operating end position, a protection element is formed between the air guide element and the remaining body, which protection element is configured so as to be able to at least partially close a gap formed between the air guide element and the remaining body, wherein the protection element is arranged in the gap after or with a movement of the air guide element out of its inoperative position. The advantage can be considered that of being able to avoid the flow behind the air guide element at least partially, or completely, if the gap is fully closed, as a result of which the aerodynamic drag which is reduced with the aid of the air guide element can be reduced further. Even only a partial closing of the gap and/or the formation of a labyrinth brings about an advantageous reduction in the aerodynamic drag.

The extended air guide element has the flow guide surface which conducts the air flowing around the vehicle as far as the end of the air guide element, at which the air can separate in a defined manner. A leakage at the extended air guide element may lead to a flow deflection at a front side, upper side or lower side of the air guide element in relation to the closed state, in other words the inoperative state, which may result in an increase in the aerodynamic drag of the entire vehicle. The protection element can consist, for example, of a carrier part, a front sealing lip and/or an underflow guard which, as viewed in the direction of a body vertical axis, is formed at the top and/or bottom of the air guide element. Additional closing parts may also be assigned to the protection element.

A complete closing of the gap can be brought about by the protection element being designed as a volume element, or by it being designed in a manner similar to a frame. That is to say, in other words, that the protection element can completely or partially close the gap in at least one gap plane, preferably in a plurality of gap planes.

The protection element is advantageously fixedly connected to the air guide element so that a positioning of the protection element in the gap is brought about simultaneously with a movement of the air guide element. Similarly, when the air guide element is retracted, the protection element is likewise preferably brought simultaneously into its inoperative position. The protection element can be formed as a soft component and/or from textile.

The protection element is designed to be changeable in its shape. It can thus be designed, for example, to be foldable, retractable and/or extendable. Similarly, it can be designed to be latchable into the remaining body, in preferably the operating end position of the air guide element, so that, even at high speeds, the protection element is secured in position.

The production of the protection element at least partially from textile results in simplified accommodating of the protection element in the inoperative position of the air guide element and in simplified positioning of the protection element in the gap since the textile element is very greatly variable in its shape.

The protection element is advantageously designed to be movable separately or coupled to the movement mechanism.

In order to bring about or support a lightweight construction of the body, the protection element is advantageously produced as a composite component.

BRIEF DESCRIPTION OF THE DRAWINGS

Further advantages, features and details of the invention will emerge from the following description of preferred exemplary embodiments and from the drawings. The features and feature combinations mentioned above in the description and the features and feature combinations mentioned below in the description of the figures and/or shown in the figures alone are able to be used not only in the respectively specified combination but also in other combinations or individually without departing from the scope of the invention. Identical or functionally identical elements are denoted by identical reference signs. In the figures.

DETAILED DESCRIPTION OF THE INVENTION

Figure 1:
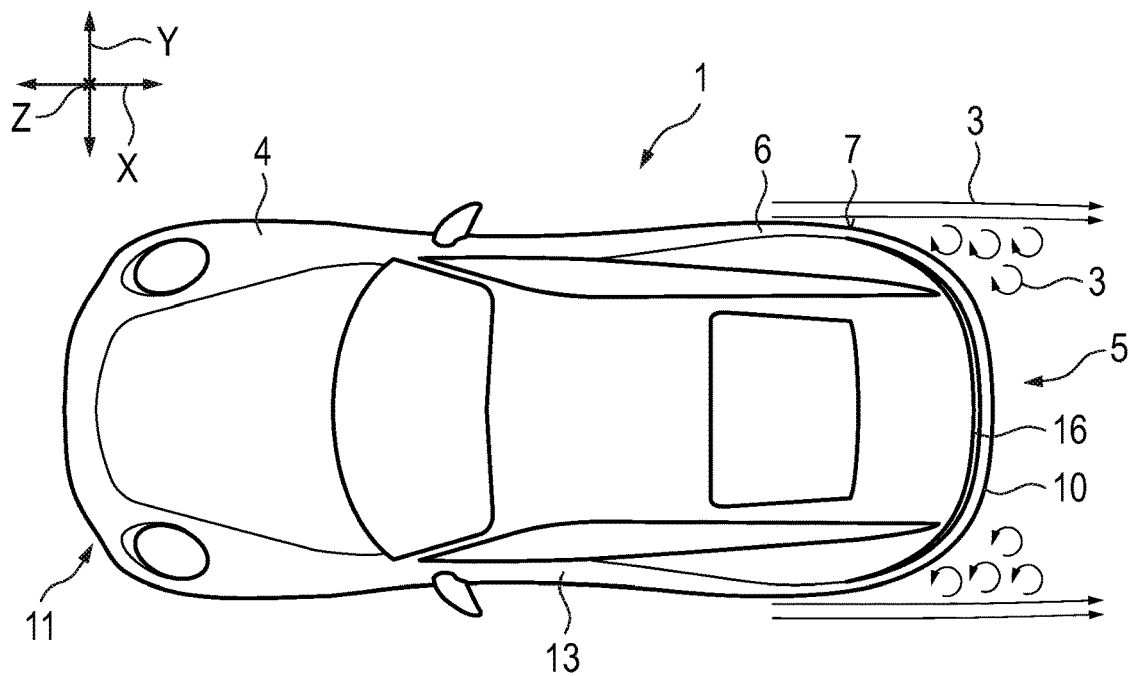
FIG. 1 shows, in a top view, a motor vehicle with an air guide device according to aspects of the invention in its inoperative position.

FIG. 1, in a top view, depicts a motor vehicle 1 with an air guide device 9 according to aspects of the invention in an inoperative position, wherein flow lines 3 are shown symbolizing a flow direction of an airflow during operation of the motor vehicle 1. The air guide device 9 comprises an air guide element 2 and a movement mechanism 27 for positioning the air guide element 2, the movement mechanism 27 being partially depicted in FIGS. 3 and 5.

A body 4 of the motor vehicle 1 has a rounded rear 5 which is designed, in order to reduce a coefficient of aerodynamic drag of the body 4, so as to have a defined tapering in the direction of a transverse axis Y of the body 4 and a defined separation edge. The air guide element 2 and its primary effect of guiding the air flow is, however, independent of a shape of the rear 5. The air guide element 2 forms part of the body 4, but is movable.

The air guide element 2 is provided for reducing airflow vortices which may lead to an increase in the coefficient of aerodynamic drag. For this purpose, the air guide element 2 is designed as at least part of a rear side part 6 or as the rear side part 6 itself so as to be movable relative to the remaining body 4, thus the portion of the body 4 without the air guide element 2. The rear side part 6 has a flow guide surface 7 which is designed to face the environment and along which air flows and which guides the air.

The air guide element 2 is designed, in particular in its operating end position, to extend the flow guide surface 7 along a longitudinal extent, therefore in particular along a longitudinal axis X of the body 4. That is to say, in other words, that the air guide element 2 extends, of course, in addition to its extent along the body longitudinal axis X, along the body transverse axis Y and a body vertical axis Z, as a result of which it also comprises flow guidance along the body transverse axis Y and the body vertical axis Z, but its function is predominantly to extend the flow guide surface 7 for flow guidance along the body longitudinal axis X. Or, described differently, the air guide element 2 is configured, in particular in its operating end position, to extend the flow guide surface 7 along a longitudinal axis X of the body 4 in the direction of a rear end surface 24. It could also protrude beyond the rear end surface 24.

The rear side part 6 is designed so as to at least partially have a wheel house 8 and, depending on the design of the body 4, it can at least partially have a rear light opening, not illustrated specifically, and at least partially a bumper 10, and is furthermore designed to be adjacent at its first abutting edge 12, which is designed to face a front 11 of the body 4, to a side part 13, which at least partially has a door frame 14 in the present exemplary embodiment.

Said rear side part 6 is designed, at its second abutting edge 15, which is designed to face away from the first abutting edge 12, to be adjacent to a rear central part 16, wherein the rear central part 16 has, starting from the front 11, a greatest extent of the body 4 along the body longitudinal axis X. Or, described differently, the rear central part 16 represents a rear end of the body 4, as viewed from the front 11. The rear central part 16 is designed so as to extend predominantly in the direction of the body transverse axis Y.

In the direction of the body vertical axis Z, the rear side part 6 is designed so as to be adjacent, with its third abutting edge 17, to a C pillar structure 18 of the body 4. A fourth abutting edge 19 of the rear side part 6 is designed to face away from the third abutting edge 17 and comprises part of the wheel house 8 and an end edge 20 of the rear side part 6 in relation to a driving surface 21.

It should be mentioned at this juncture that the abutting edges 12, 15, 17, 19 of the rear side part 6 do not necessarily have to be designed to be adjacent to the aforementioned components of the body 4, but rather said components are intended merely to serve for spatial orientation of the abutting edges 12, 15, 17, 19 in order to describe the air guide device 9 according to aspects of the invention.

In order to position the air guide element 2 from its inoperative position into its operating end position, it is designed so as to be able to carry out at least one pivoting movement about a pivot axis 22, wherein the pivot axis 22 extends along or predominantly along the body vertical axis Z. That is to say, in other words, that the air guide element 2 is arranged on the body 4 so as to be pivotable about the pivot axis 22 out of its inoperative position into a first operating position that is to be taken up before reaching its operating end position.

If the pivot axis 22 does not extend exactly along the body vertical axis Z, it can be designed, in an exemplary embodiment that is not illustrated specifically, so as to enclose an acute angle with the body vertical axis Z. Furthermore, it can be designed, likewise not depicted specifically, depending on its arrangement, to also enclose a further acute angle with the body transverse axis Y and/or an additional acute angle with the body longitudinal axis X. Of course, the angles are each formed starting from an intersecting point of the axes X, Y, Z between the axis portions extending in the same direction. That is to say, in other words, that the pivot axis 22 does not necessarily have to be designed exactly with respect to the body vertical axis Z, but may also be arranged obliquely with respect thereto. The pivot axis 22 preferably extends along a cord of the rear side part 6 or parallel thereto or is even designed to be curved in accordance with a contour 23 of the rear side part 6.

Figure 2:
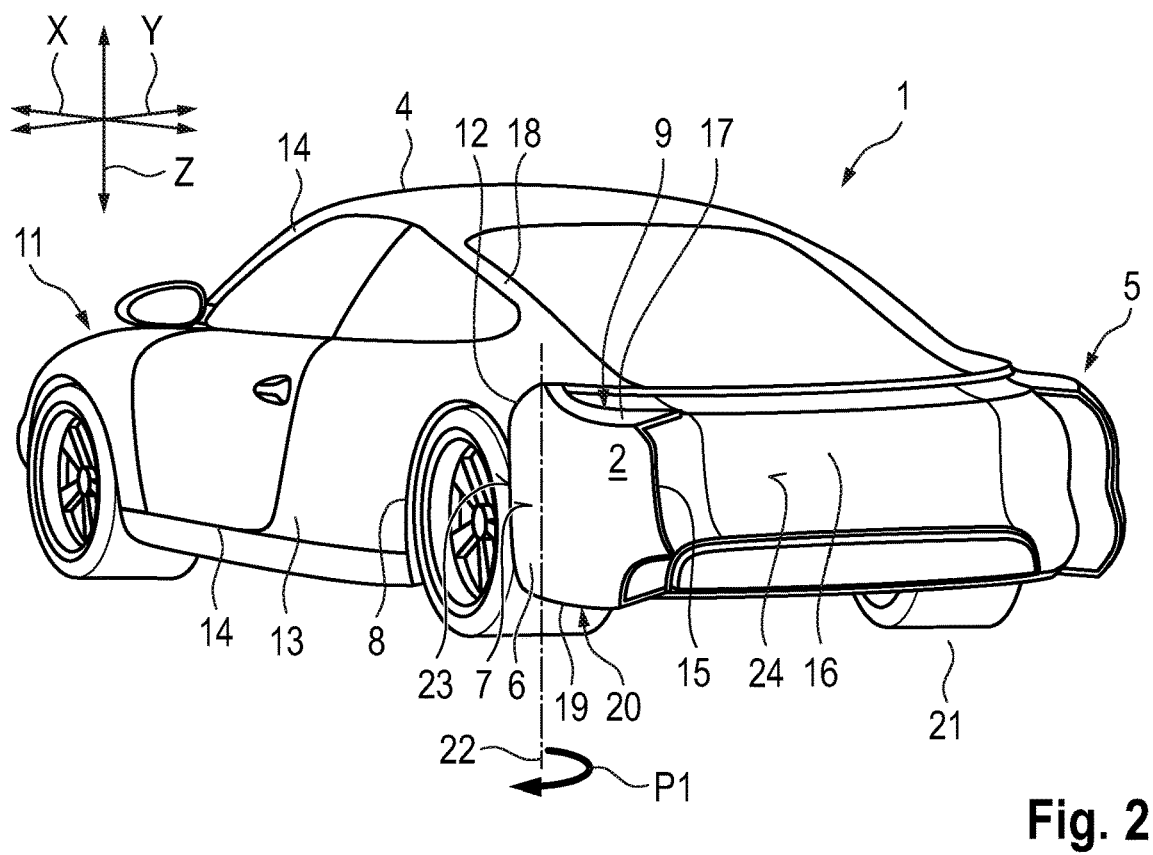
FIG. 2 shows, in a perspective view, the motor vehicle with the air guide device according to aspects of the invention in its operating end position.

The air guide device 9 according to aspects of the invention has, as depicted in FIG. 2, the air guide element 2 in the form of the rear side part 6. That is to say, in other words, that, in order to position the air guide element 2 into its operating end position, the entire rear side part 6 is pivoted about the pivot axis 22, as is illustrated with the aid of the arrow P1. That is to say that the rear side part 6 is arranged movably on the body 4 and can be brought into the inoperative position and at least its operating end position.

It should be mentioned at this juncture that the air guide element 2 is brought starting from its operating end position into its inoperative position by means of a movement directed counter to the movement into its operating end position. If two or more movement steps are involved for the positioning into the operating end position, these are carried out in a reverse sequence with regard to the positioning starting from the inoperative position into the operating end position.

In a further exemplary embodiment, not depicted specifically, the pivot axis 22 of the air guide device 9 according to aspects of the invention is arranged transversely with respect to the body axes X, Y, Z, wherein the first abutting edge 12 is pivoted under the adjacent components of the body 4 during the positioning of the air guide element 2 into its operating end position. The second abutting edge 15 and the fourth abutting edge 19 are moved in the direction facing away from the rear central part 16 by the pivoting about the pivot axis 22.

The air guide element 2 is dependent on the shape of the rear side part 6 since it is either itself formed as the latter or as part of the rear side part 6 and is arranged flush therewith in its inoperative position. This means that, in the case of a body shape according to the exemplary body 4, which has a rounded rear 5, the air guide element 2 in the operating position brings about a reduction of a rear end surface 24 to which flow can be freely directed. The reduction is all the greater, the rounder the rear 5 is.

The movement mechanism 27 can be designed in the form of a multi-joint mechanism, wherein the movement mechanism 27 is arranged on the body 4, in a manner supported there. The movement mechanism 27 is activated with the aid of a control device, not illustrated specifically, of the motor vehicle. The movement mechanism 27 could also be designed in the form of a sliding gate.

According to aspects of the invention, in order to avoid a flow behind the air guide element 2, a protection element 25 is arranged on the air guide element 2, said protection element, in at least the operating end position of the air guide element 2, at least partially closing a gap 26 formed between the protection element 25 and the remaining body 4.

Figure 3:
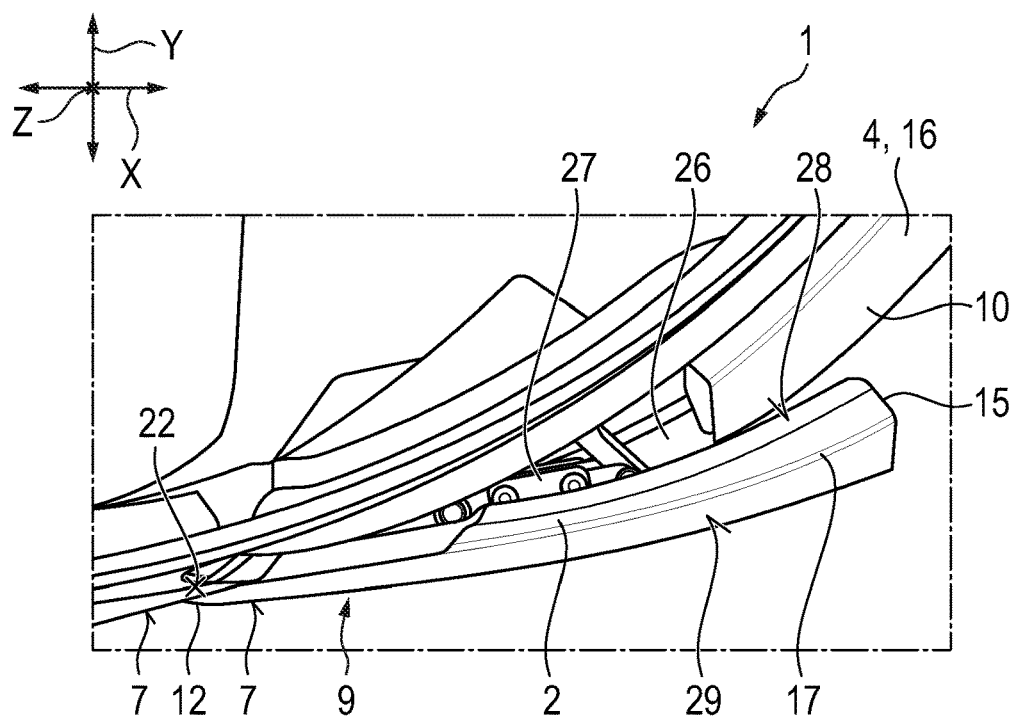
FIG. 3 shows, in a perspective top view, a detail from the motor vehicle with an air guide device according to aspects of the invention without a protection element and in its operating end position.
Figure 4:
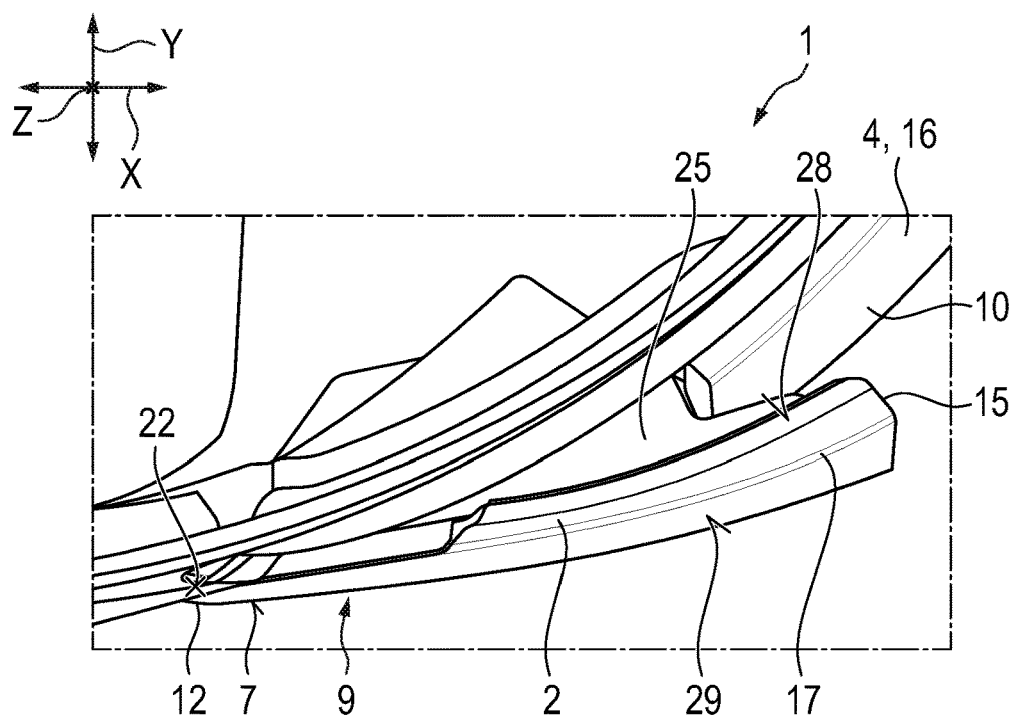
FIG. 4 shows, in a perspective top view, a detail from the motor vehicle with a first exemplary embodiment of the air guide device according to aspects of the invention in its operating end position.
Figure 5:
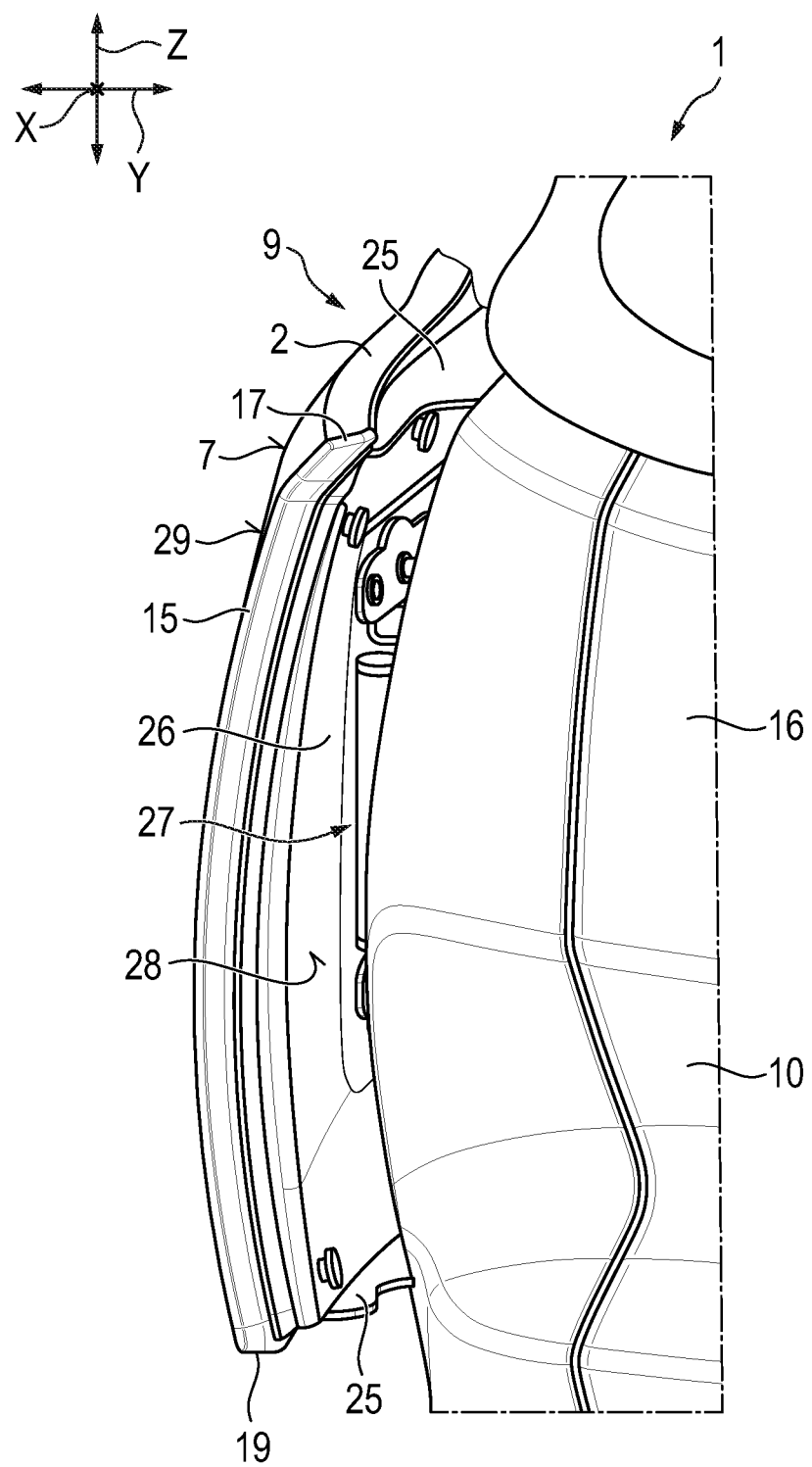
FIG. 5 shows, in a perspective top view, a detail from the motor vehicle with a second exemplary embodiment of the air guide device according to aspects of the invention in its operating end position.

FIG. 3 depicts the air guide device 9 without a protection element 25, and the gap 26 can be seen clearly. FIGS. 4 and 5 depict the air guide device 9 according to aspects of the invention in two different exemplary embodiments.

In the first exemplary embodiment according to FIG. 4, the protection element 25 is arranged in the region of the third abutting edge 17, therefore on that side of the air guide element 2 which faces away from the driving surface 21, or, in other words, on top of the air guide element 2.

The second exemplary embodiment, which is illustrated in FIG. 5, has the air guide element 2 both at the top and at the bottom, or, in other words, in the region of the third abutting edge 17 and in the region of the fourth abutting edge 19.

In a third exemplary embodiment, not illustrated specifically, a further protection element is additionally formed in the region of the second abutting edge 15, therefore on that side of the air guide element 2 which faces away from the first abutting edge 12.

If the air guide element 2 is moved out of its inoperative position, the gap 26 is brought about, the gap being formed between the remaining body 4 and the air guide element 2, in particular a lower surface 28 of the air guide element 2. The lower surface 28 is that surface of the air guide element 2 which is formed facing away from a surface 29 that is part of the flow guide surface 7.

The gap 26, which is three-dimensional and extends in the direction of the body longitudinal axis X, the body transverse axis Y and the body vertical axis Z, has gap planes in which the protection element 25 can be arranged in order to avoid a flow behind the air guide element 2.

In the abovementioned exemplary embodiments, the protection element 25 is arranged in gap planes stretching along the body longitudinal axis X and the body transverse axis Y, a first gap plane in the region of the fourth abutting edge 19 and/or a second gap plane in the region of the third abutting edge 17. It could likewise also be formed in a gap plane which extends in a different combination of the body axes X, Y, Z. The protection element 25 could also be designed as a volume element which is designed to completely fill and close the gap 26.

The protection element 25 is accommodated on the air guide element 2 and, as can be seen in particular in FIG. 5, is fixedly connected thereto. The closing of the gap 26 therefore takes place directly with a movement of the air guide element 2 out of its inoperative position. If the air guide element 2 is retracted again into its inoperative position, the protection element 25 is likewise brought into its inoperative position.

The protection element 25 can be designed in the form of a disk, having a rigid shape, as is illustrated in FIGS. 4 and 5. It can likewise also be designed to be changeable in its shape. It can be, for example, foldable, retractable or extendable. It can be designed, for example, to be latchable into the remaining body 4 so that, even at high speeds, a side of the protection element 25 designed to face the remaining body 4 is securely accommodated.

The protection element 25 could also be produced from textile such that stowage between the air guide element 2 and the remaining body 4 is possible in a simple manner. In an advantageous exemplary embodiment, the protection element 25 is produced as a composite component such that it can be reduced in weight.

In the present exemplary embodiments, the protection element 25, since it is fixedly connected to the air guide element 2, is coupled movably to the movement mechanism 27. However, it could likewise also be movable separately, by means of a further movement mechanism, not depicted specifically.

LIST OF REFERENCE SIGNS

1 Motor vehicle
2 Air guide element

3 Flow line
4 Body
5 Rear
6 Rear side part
7 Flow guide surface
8 Wheel house
9 Air guide device
10 Bumper
11 Front
12 First abutting edge
13 Side part
14 Door frame
15 Second abutting edge
16 Rear central part
17 Third abutting edge
18 C pillar structure
19 Fourth abutting edge
20 End edge
21 Driving surface
22 Pivot axis
23 Contour
24 Rear end surface
25 Protection element
26 Gap
27 Movement mechanism
28 Lower surface
29 Upper surface
P1 Arrow
X Body longitudinal axis
Y Body transverse axis
Z Body vertical axis

What is claimed is:

1. An air guide device for a motor vehicle, the air guide device comprising:
    an air guide element forming at least part of a rear side part of a body of the motor vehicle, wherein the rear side part has a flow guide surface which faces an environment of the motor vehicle and along which air flows, and the air guide element having a surface which forms at least part of the flow guide surface, the air guide element being movable relative to a remaining body of the vehicle between an inoperative position, in which the air guide element is arranged flush with the remaining body, and at least one operating end position, in which the air guide element extends the flow guide surface along a body longitudinal axis (X) of the body;
    a movement mechanism for guiding movement of the air guide element; and
    a protection element disposed between the air guide element and the remaining body for either limiting or preventing air flow behind the air guide element in the operating end position of the air guide element, wherein the protection element is configured to at least partially close a gap formed between the air guide element and the remaining body,
    wherein the protection element is arranged in the gap either after or along with a movement of the air guide element out of the inoperative position.

2. The air guide device as claimed in claim 1, wherein the protection element at least partially closes the gap in a plane of the gap.

3. The air guide device as claimed in claim 1, wherein the protection element completely closes the gap.

4. The air guide device as claimed in claim 1, wherein the protection element is fixedly connected to the air guide element.

5. The air guide device as claimed in claim 1, wherein the protection element is changeable in shape.

6. The air guide device as claimed in claim 5, wherein the protection element is foldable, retractable, extendable or latchable.

7. The air guide device as claimed in claim 1, wherein the protection element is at least partially produced from textile.

8. The air guide device as claimed in claim 1, wherein the protection element is either movable separately or coupled to the movement mechanism.

9. The air guide device as claimed in claim 1, wherein the protection element is a composite component.

10. A motor vehicle comprising the air guide device as claimed in claim 1.

* * * * *